United States Patent
Butcher et al.

(10) Patent No.: US 9,860,189 B2
(45) Date of Patent: Jan. 2, 2018

(54) SYSTEMS AND METHODS TO ENABLE NETWORK COMMUNICATIONS FOR MANAGEMENT CONTROLLERS

(71) Applicants: Wade A. Butcher, Cedar Park, TX (US); Richard L. Holmberg, Austin, TX (US); Elie A. Jreij, Pflugerville, TX (US); Timothy M. Lambert, Austin, TX (US)

(72) Inventors: Wade A. Butcher, Cedar Park, TX (US); Richard L. Holmberg, Austin, TX (US); Elie A. Jreij, Pflugerville, TX (US); Timothy M. Lambert, Austin, TX (US)

(73) Assignee: Dell Products LP, Round Rock, TX (US)

( * ) Notice: Subject to any disclaimer, the term of this patent is extended or adjusted under 35 U.S.C. 154(b) by 120 days.

(21) Appl. No.: 14/700,891

(22) Filed: Apr. 30, 2015

(65) Prior Publication Data

US 2016/0323148 A1    Nov. 3, 2016

(51) Int. Cl.
*H04L 12/24* (2006.01)
*H04L 12/911* (2013.01)

(52) U.S. Cl.
CPC .............. *H04L 47/78* (2013.01); *H04L 41/04* (2013.01)

(58) Field of Classification Search
CPC ................................ H04L 47/78; H04L 41/12
USPC ......................................................... 709/226
See application file for complete search history.

(56) References Cited

U.S. PATENT DOCUMENTS

| | | | |
|---|---|---|---|
| 7,574,594 B2 | 8/2009 | Winter | |
| 7,620,057 B1* | 11/2009 | Aloni | ................... G06F 12/0804 370/395.7 |
| 7,688,838 B1* | 3/2010 | Aloni | ..................... G06F 13/128 370/395.7 |
| 7,826,470 B1* | 11/2010 | Aloni | ....................... H04L 49/90 370/419 |
| 7,835,380 B1* | 11/2010 | Aloni | ................ H04L 12/40032 370/394 |
| 8,094,550 B2 | 1/2012 | Winter | |
| 8,478,907 B1* | 7/2013 | Aloni | ..................... G06F 13/128 709/225 |
| 8,839,007 B2 | 9/2014 | Rahardjo et al. | |

(Continued)

OTHER PUBLICATIONS

Hernandez et al., "Dell PowerEdge Select Network Adapters—The Freedom to Choose", Dell, Jan. 2012, 19 pgs.

(Continued)

*Primary Examiner* — Kostas Katsikis
(74) *Attorney, Agent, or Firm* — Egan Peterman Enders Huston

(57) ABSTRACT

Systems and methods are provided that may be implemented to use memory as a shared interface between a management controller (e.g., such as embedded baseboard management controller "BMC", embedded service processor, non-embedded management controller, etc.) and a network controller of an information handling system (e.g., such as a server) in order to achieve a relatively high speed data path between a network and the management controller, and without requiring the use and/or presence of a high speed physical connection to and/or from a sideband interface of the network controller.

18 Claims, 13 Drawing Sheets

(56) References Cited

U.S. PATENT DOCUMENTS

| | | | | |
|---|---|---|---|---|
| 2004/0174570 | A1* | 9/2004 | Plunkett | B41J 2/04505 358/3.13 |
| 2005/0223118 | A1* | 10/2005 | Tucker | H04L 67/1097 709/250 |
| 2006/0067346 | A1* | 3/2006 | Tucker | G06F 12/1081 370/412 |
| 2006/0236165 | A1* | 10/2006 | Cepulis | G06F 11/1008 714/721 |
| 2008/0183712 | A1* | 7/2008 | Westerinen | G06F 21/121 |
| 2010/0131783 | A1* | 5/2010 | Weng | G06F 1/3203 713/320 |
| 2011/0154080 | A1* | 6/2011 | Wang | G06F 1/3228 713/323 |
| 2012/0079482 | A1* | 3/2012 | Wang | G06F 1/3203 718/100 |
| 2012/0110352 | A1* | 5/2012 | Branover | G06F 1/206 713/300 |
| 2013/0067137 | A1* | 3/2013 | Molloy | G06F 12/0246 711/103 |
| 2013/0246820 | A1* | 9/2013 | Branover | G06F 1/3296 713/320 |
| 2014/0181364 | A1* | 6/2014 | Berke | G06F 13/16 711/103 |
| 2014/0281056 | A1* | 9/2014 | Davda | G06F 12/1081 710/26 |
| 2014/0281615 | A1* | 9/2014 | Panneer | G06F 1/3234 713/323 |
| 2015/0311957 | A1* | 10/2015 | Dube | H04B 5/0031 455/41.1 |
| 2015/0312702 | A1* | 10/2015 | Raju | H04W 4/008 455/41.1 |
| 2015/0370586 | A1* | 12/2015 | Cooper | G06F 9/45533 710/308 |
| 2016/0179156 | A1* | 6/2016 | Eastep | G06F 1/324 713/300 |
| 2016/0275037 | A1* | 9/2016 | Dube | G06F 13/4282 |

OTHER PUBLICATIONS

Wikipedia, NC-SI, Printed From Internet Mar. 17, 2015, 2 pgs.
NVIDIA GPU Direct, Printed From Internet Apr. 29, 2015, 6 pgs.
Mellanox Technologies, "Mellanox OFED GPUDirect RDMA", Product Brief, 2014, 2 pgs.
DMTF, "NC-SI Over MCTP Binding Specification", DSPO261, Aug. 22, 2013, 31 pgs.
Ross et al., "Systems and Methods for Configuring and Controlling Variable Pressure and Variable Displacement Sensor Operations for Information Handling Systems", Filed Mar. 13, 2014, U.S. Appl. No. 14/209,382, 47 pgs.
Montero et al., "Systems and Methods for User Modification of Cooling Device Response in Information Handling Systems", Filed Jan. 14, 2014, U.S. Appl. No. 14/154,840, 37 pgs.
Bloor, Inside Analysis, "What is a Service Processor? and Why Should I Care?", labelled "May 12, 2008" and Printed from Internet Feb. 17, 2017, 4 pgs.
Search Networking, Baseboard Management Controller (BMC), labelled "last updated in May 2007" and Printed from Internet Feb. 17, 2017, 4 pgs.

* cited by examiner

SYSTEMS AND METHODS TO ENABLE NETWORK COMMUNICATIONS FOR MANAGEMENT CONTROLLERS

FIELD OF THE INVENTION

This invention relates generally to information handling systems and, more particularly, to network communications with information handling system components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Embedded controllers such as baseboard management controllers (BMCs) in information handling systems such as servers do not include the sophistication of Ethernet MACs, and thus network connectivity for remote access to embedded controllers has been limited to relatively slow speed interfaces (I$_2$C and SMBUS) to the sideband of a network interface controller (NIC), such as a LAN on motherboard (LOM) device. The traditional bandwidth allowed with such relatively slow interfaces is 100 KHz, 400 KHz or 1 MHz. An I$_2$C interface significant limits implementation of embedded controller system features to interfaces such as Intelligent Platform Management Interface (IPMI), Data Center Manageability Interface (DCMI), command line interfaces, serial over LAN, etc. Advanced embedded controller features requiring more bandwidth (such as virtual media, virtual video/keyboard/mouse (KVM), and remote desktop) utilize modern video resolutions that cannot be provided across the relatively slower traditional I$_2$C and SMBUS interfaces. Most of the traditional high bandwidth features are needed while the host server is in the Advanced Configuration and Power Interface (ACPI) ON state (S0).

FIG. 1 illustrates a conventional server 100 that includes a host processor/chipset device 105 and main system DRAM memory 115 that is coupled via dual data rate (DDR) channel 150 as shown to host processor (CPU) 105 of chipset 105. Server 100 also includes local system storage 135 in the form of one or more media drives 135 to provide permanent storage for the server 100, and a power supply component 160 that is coupled to AC mains 185. Power supply 165 may receive AC mains current and produce a regulated DC power source for the various components of system 100 perform power supply functions such as AC to DC conversion and voltage regulation. Server 100 also includes an embedded controller in the form of BMC 180 that is provided on the same planar board as the host processor/chipset 105, and that is coupled to communicate with host processor 105 via PCIe bus 120 or alternatively a low pin count (LPC), enhanced serial peripheral interface (SPI) or USB bus.

Still referring to FIG. 1, a network controller 160 is provided that is coupled to an external network 190 by an Ethernet data link interface 192. Network controller 160 operates at the physical layer and data link layer (including filtering at the Media Access Control MAC address layer) to exchange incoming data packets and outgoing data packets between external network 190 and particular components of server 100. As shown, network controller 160 is coupled to both provide incoming network data traffic to host processor 105 and to receive outgoing network data traffic from host processor 105 across relatively high-speed Peripheral Component Interconnect Express (PCIe) serial bus 152 which is a host to I/O adapter type message transport/bus/interface. Network controller 160 is also coupled as shown by a relatively slow Network Controller Sideband Interface (NC-SI) to exchange incoming and outgoing Ethernet data pass-through traffic between network 190 and BMC 180 to enable remote out-of-band management of server 100. Besides pass-through network traffic, NC-SI interface 101 also carries command and control traffic between BMC 180 and network controller 160 to configure and control the NC-SI interface 101, and interrupts from the network controller 160 to the BMC 180.

FIG. 2 illustrates conventional methodology for communication of incoming network traffic received across data link 192 to BMC 160 and host processor/chipset 105 based on MAC address filtering. As shown data packets destined for host processor/chipset 105 are transferred across PCIe bus 152 to a receive buffer in system memory 115. Data packets destined for BMC 180 are transferred as pass-through Ethernet packets over Reduced Media Independent Interface Based transport (RBT) across sideband interface connection 101 using NC-SI protocol. FIG. 3 illustrates conventional methodology for communication of outgoing (egress) network traffic received from BMC 160 across data link 192 to external network 190. As shown data packets destined for external network 190 are transferred as pass-through Ethernet packets to network controller 160 RBT across sideband interface connection 101 using NC-SI protocol. Sideband communication of incoming and outgoing packets across sideband interface 101 is shared with transmittal of command and control traffic between BMC 180 and network controller 160.

CPU and chipset providers have emerging offerings of chipset integrated embedded microcontrollers (such as "Innovation Engines" or "IEs") that can provide BMC functionality without the need for an external BMC chip, circuitry and firmware. These conventional IE's do not provide Ethernet Media Access Control Layer (MAC) functionality and rely on external NIC sideband interfaces for network connectivity. Proposals have been made for network controller (e.g., network interface controller (NIC)) sideband interfaces that utilize gigabit-based interfaces such as Serial Gigabit Media Independent Interface (SGMII) and reduced gigabit media-independent interface (RGMII), rather than 100 Mbps Reduced Media Independent Interface (RMII)-based interfaces.

GPUDirect is a method that allows network adapters to transfer memory contents from one GPU to another remote GPU via remote direct memory access (RDMA) without involvement from the host processor, and utilizes peer-to-peer messaging for intercommunication between two devices on the same root complex. GPUDirect is not possible for integrated devices that may or may not sit on the PCIe interface. Existing interconnects such as system management bus (SMBus) can be used, but those do not provide the throughput needed for high bandwidth applications such as remote desktop.

SUMMARY

Disclosed herein are systems and methods that may be implemented in one embodiment to use system memory and/or management controller memory as a shared interface between a management controller (e.g., such as embedded baseboard management controller "BMC", embedded service processor, non-embedded management controller, etc.) and a network controller of an information handling system (e.g., such as a server) in order to achieve a relatively high speed data path between a network and the management controller, and without requiring the use and/or presence of a high speed physical connection to and/or from a sideband interface of the network controller. In one embodiment, the disclosed systems and methods may be implemented for a variety of different system configurations to enable communication between any two devices that each support direct memory access (DMA), such as communications between an embedded controller (e.g., such as baseboard management controller "BMC", service processor, etc.) and an external or non-embedded network controller, or to enable communications between an embedded LAN on motherboard (LOM) or other type of embedded network controller device and an external non-embedded management controller (e.g., such as on a daughter card). In one exemplary embodiment, the disclosed systems and methods may be advantageously implemented to expand network and server management capabilities for embedded controller/s of an information handling system platform architecture without a Network Controller Sideband Interface (NC-SI) connection to shared LOM (LAN on Motherboard) or other network controller device/s, such as a 100 Mbps-based NC-SI connection.

In one exemplary embodiment, the disclosed systems and methods may be implemented to achieve cost savings for information handling systems such as servers by allowing the use of more basic embedded controllers (e.g., BMCs) having more basic capabilities and less complex firmware requirements, such as off-the-shelf, lower end embedded controllers or microcontrollers that have no Ethernet MAC capability (e.g., with no NC-SI or other type of sideband interface to a network controller), and chipset integrated embedded controller engines. In another exemplary embodiment, the disclosed systems and methods may be implement to achieve increased information handling system platform density by adopting smaller service processor circuitry such as off-the-shelf microcontrollers or chipset integrated engines (e.g., to achieve higher density micro-servers) while at the same time maintaining high speed system networking paths. In yet another exemplary embodiment, the disclosed systems and methods may be implemented with LOM, network daughter card (NDC) and other adapter card topologies that lack the physical and/or electrical ability to provide a high speed sideband connection. e.g., such as shared NIC interfaces where reduced media independent interface (RMII)-based NC-SI connections to all network controller PCIe slots in an information handling system is not possible or implemented.

In a further possible embodiment, the disclosed systems and methods may be employed together with information handling system platforms (e.g., such as servers) having network controllers that employ gigabit-based sideband interfaces such as a Serial Gigabit Media Independent Interface (SGMII), reduced gigabit media-independent interface (RGMII), etc. (e.g., rather than a 100 Mbps RMII-based network controller sideband interface). In one example, the disclosed systems and methods may be advantageously implemented with SGMII sideband equipped add-in cards and LOMs, while at the same time offering the maximum available bandwidth per platform. In yet another exemplary embodiment, the disclosed systems and methods may be implemented in information handling system platforms such as servers to provide a high speed network-to-embedded controller path while removing the need for a physical high speed connection to a network controller sideband interface including, for example, information handling system platforms having always-available high speed interfaces (e.g., including Host Embedded Controller Interface "HECI" for innovation engines "IEs" and PCIe shared memory for advanced BMCs) provided between the system host processing device and a management controller such as BMC or IE. Such high speed interfaces outperform previously-available host interfaces such as the Keyboard Controller Style (KCS) interface on the Low-pin-count (LPC) busses that have existed for many generations.

In one respect, disclosed herein is an information handling system, including: a processing device configured as a network controller, the network controller being configured to be coupled to exchange incoming and outgoing network data packets with an external network; main system memory; a host processing device coupled to the network controller and coupled to the main system memory; a processing device configured as a management controller, the management controller being coupled to the host processing device; and management controller memory coupled to the management controller and to the host processing device. One or more of the processing devices of the system may be configured to provide incoming network data packets from the network controller to the management controller through the management controller memory, and one or more of the processing devices of the system may be configured to provide outgoing network data packets from the management controller to the network controller through the management controller memory.

In another respect, disclosed herein is a method of handling network packets in an information handling system, including: using a processing device configured as a network controller of the information handling system to exchange incoming and outgoing network data packets with an external network; providing incoming network data packets to the information handling system from the network controller to a processing device configured as a management controller of the information handling system through management controller memory of the information handling system that is coupled to the management controller; and providing outgoing network data packets from the management controller to the network controller through the management controller memory.

DESCRIPTION OF ILLUSTRATIVE EMBODIMENTS

Figure 1:
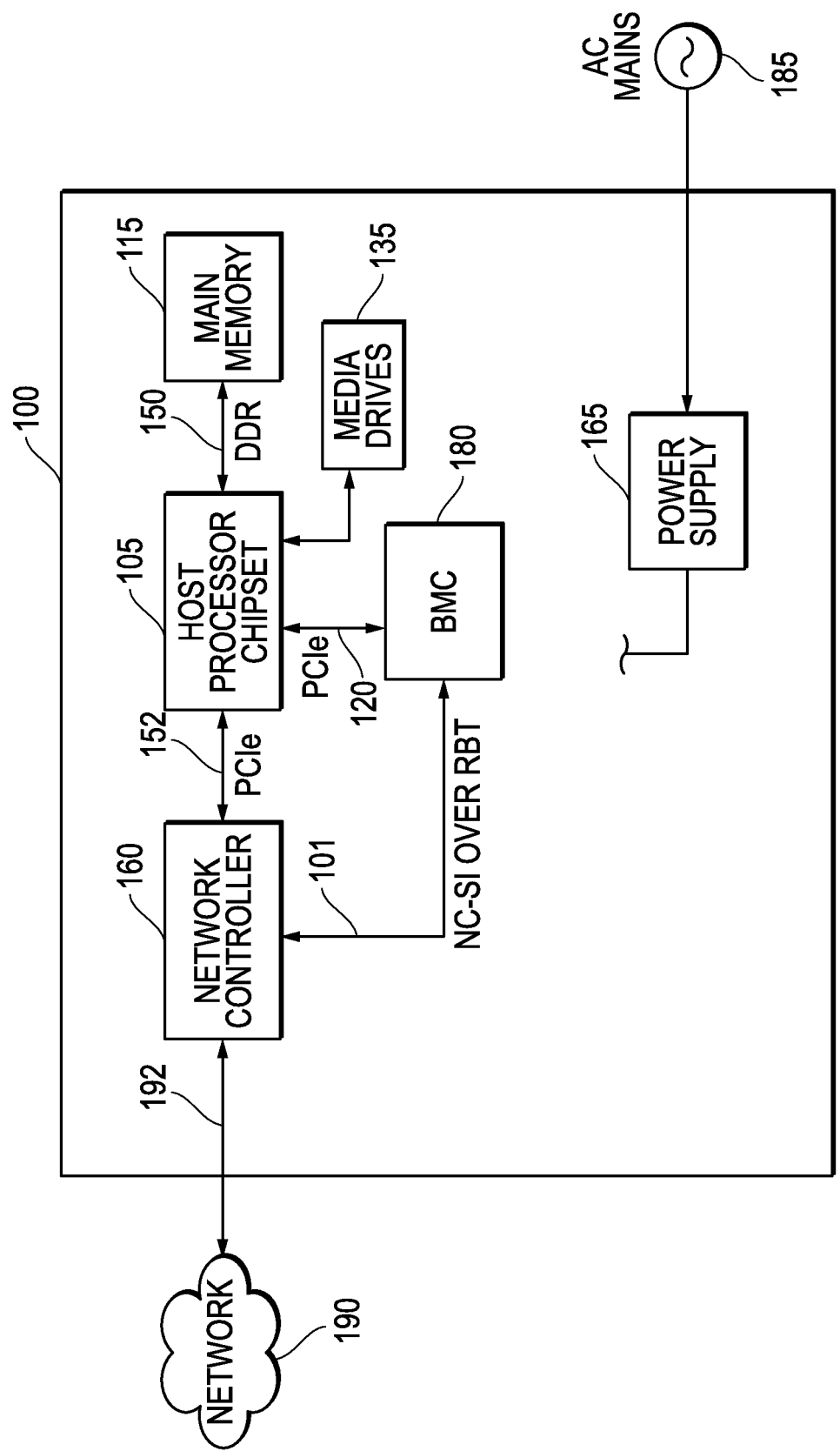
FIG. 1 illustrates a block diagram of a conventional server.
Figure 2:
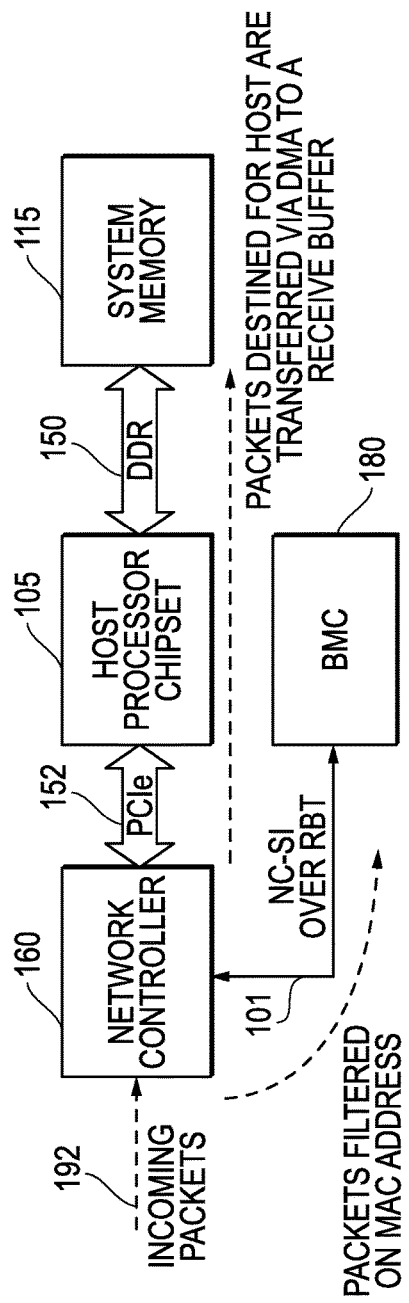
FIG. 2 illustrates conventional methodology for communication of incoming network traffic.
Figure 3:
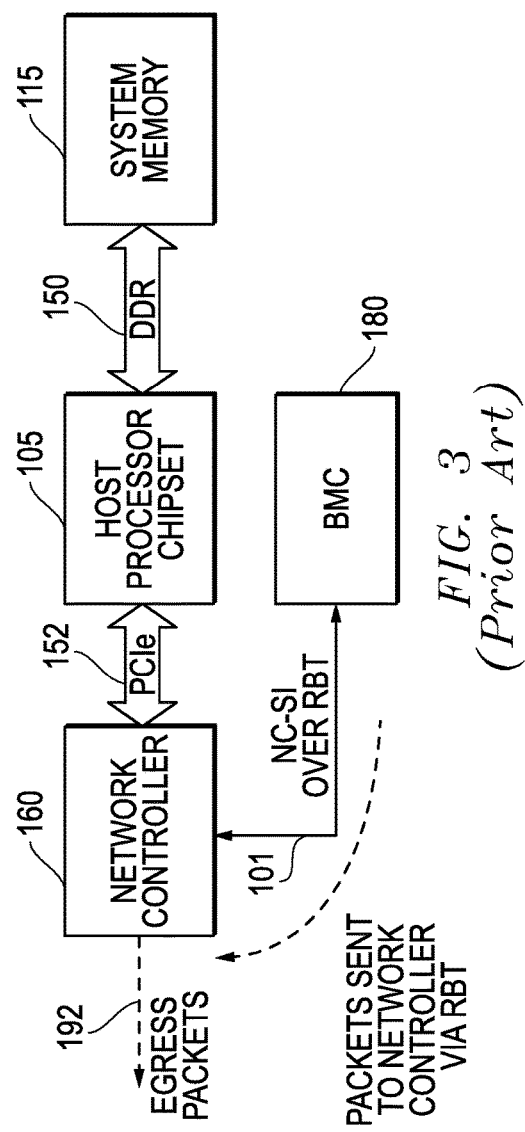
FIG. 3 illustrates conventional methodology for communication of outgoing network traffic.
Figure 4A:
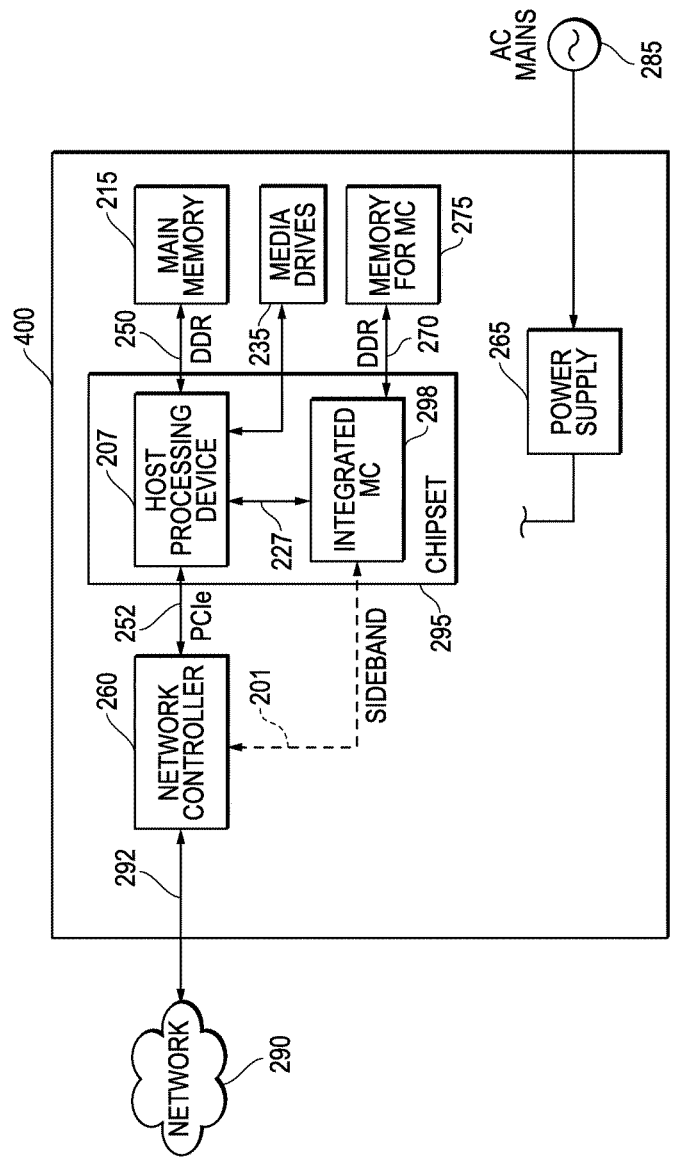
FIG. 4A illustrates a block diagram of an information handling system according one exemplary embodiment of the disclosed systems and methods.

FIG. 4A illustrates an information handling system 400 (e.g., such as a desktop workstation computer, server, etc.) that includes a chipset 205 having at least one host processing device 207 (e.g., AMD or Intel-based CPU or any other type of suitable host processing device) coupled to communicate with an integrated management controller (MC) 298 by digital IO communication path 227, e.g., a bus such as PCIe, USB, LPC, enhanced SPI, I²C, etc. Chipset 205 may include or be coupled to other optional circuitry, e.g., such as memory controller hub, platform controller hub, I/O controller hub, etc. Host processing device 207 is coupled as shown to main system memory (e.g., RAM such as DRAM) 215 via dual data rate (DDR) channel 250, and MC 298 is coupled to MC memory (e.g., RAM such as DRAM) 290 by DDR channel 270. As shown, MC memory 275 is separate from main system memory 215, and may be internal memory for management controller 298 (e.g., such as on-chip internal RAM like SRAM or other suitable RAM), or may be external memory for management controller 298 (e.g., such as off-chip external RAM like DDR2-4). Information handling system 400 also includes local system storage 235 in the form of one or more media drives (e.g., hard disk drive/s, optical drives, NVRAM devices, Flash devices or any other suitable form of internal or external storage) to provide permanent storage for the system 400. Also shown is a power supply component 265 that is coupled to AC mains 285. Power supply 265 may receive AC mains current and produce a regulated DC power source for the various components of system 400 and perform power supply functions such as AC to DC conversion and voltage regulation.

Still referring to FIG. 4A, a network controller 260 (e.g., network adapter, network interface card, LAN adapter, etc.) is provided that is coupled to an external network 290 by an Ethernet data link interface 292 or other suitable wired and/or wireless network connection, e.g., in one embodiment a network interface having a speed greater than or equal to about 1 gigabit per second such as Gigabit Ethernet (GbE). Network controller 260 operates at the physical layer and data link layer (including filtering at the Media Access Control MAC address layer) to exchange incoming data packets and outgoing data packets between external network 290 and particular components of system 400. As shown, network controller 260 is coupled to both provide incoming network data traffic to host processor 105 and to receive outgoing network data traffic from host processor 207 across Peripheral Component Interconnect Express (PCIe) serial bus 252, although any other suitable type data bus may be alternatively employed. Network controller 260 is also coupled as shown by an optional sideband interface connection 201 (e.g., such as SMBus, RMII-based Transport "RBT", etc.) that may in one embodiment may employ Network Controller Sideband Interface (NC-SI) protocol although any other suitable communication protocol may be employed. One example of such an embodiment is a "Dell PowerEdge Select Network Adapter" available from Dell Products L.P. of Round Rock Tex., in which a LOM is provided on a Network Daughter Card (NDC), although other configurations are possible. Sideband connection 201 may be employed, for example, to exchange command and control traffic between network 290 and MC 298 to configure and control the sideband interface 201, exchange interrupts from the network controller 260 to MC 298 and from MC 298 to network controller 260, etc. Packets may also be transferred across sideband connection 201, e.g., during advanced configuration and power interface (ACPI) S5 "off" state of system 400 or one of ACPI system sleep states S2-S4.

Figure 4B:
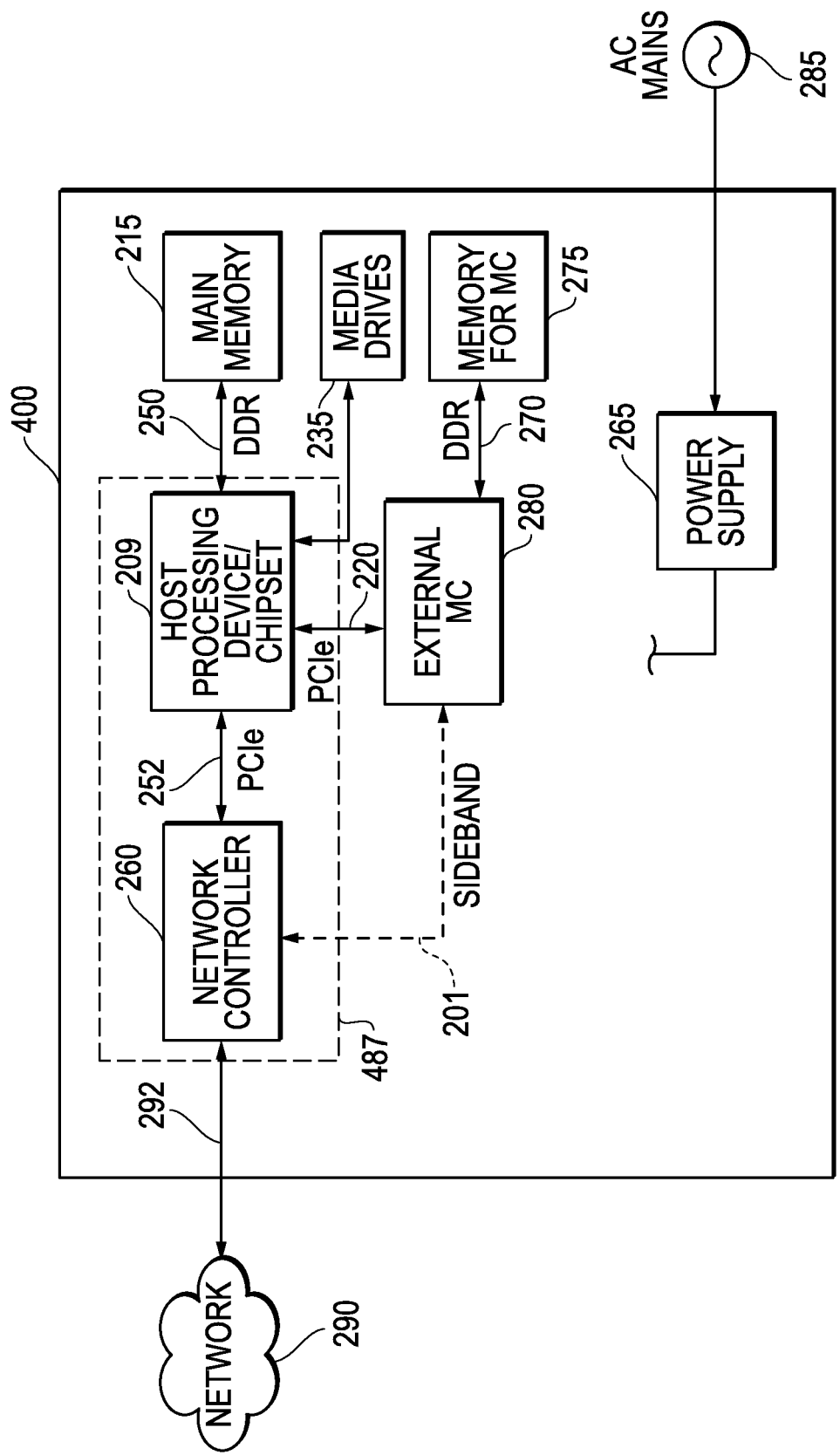
FIG. 4B illustrates a block diagram of an information handling system according one exemplary embodiment of the disclosed systems and methods.

FIG. 4B illustrates an alternate embodiment of an information handling system 450 (e.g., such as a desktop workstation computer, server, etc.) having some of the same components as FIG. 4A. However, in this alternate embodiment information handling system includes at least one host processing device 209 that may, for example, a stand-alone CPU or provided as a host processing CPU device with chipset including memory controller hub, platform controller hub, I/O controller hub, etc. In this embodiment, host processing device 209 may be coupled to communicate with external management controller (MC) 280 via digital IO communication path 220, e.g., a bus such as PCIe, USB, LPC, enhanced SPI, I²C, etc. In this embodiment, external MC 280 is not integrated in host processing device chipset 209. Also shown is optional chipset architecture 487 in which an embedded LOM network controller 260 is deployed in the chipset 487 and coupled to an external management controller 280 as shown.

Figure 5A:
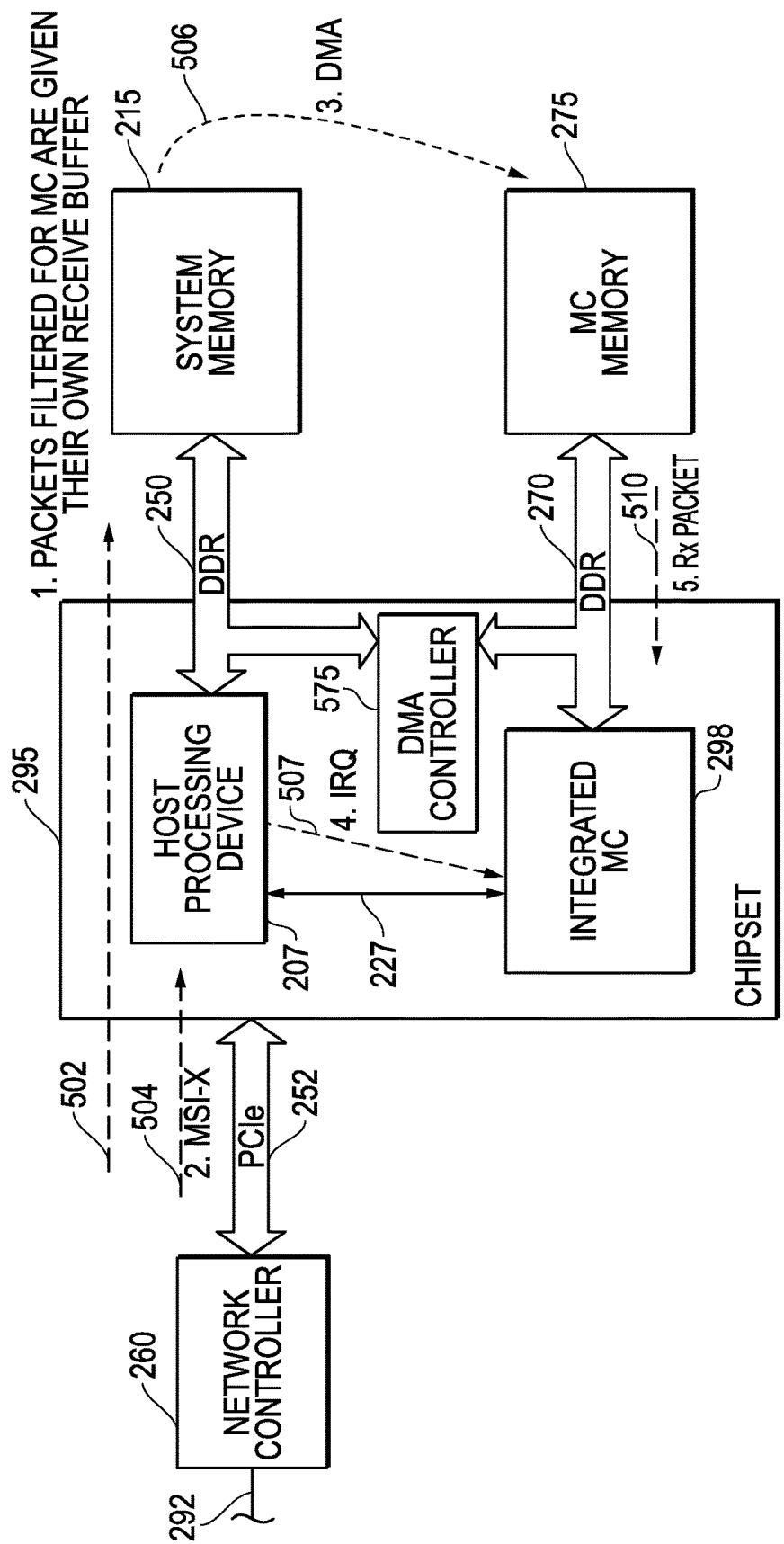
FIG. 5A illustrates methodology for communication of incoming network traffic according one exemplary embodiment of the disclosed systems and methods.

FIG. 5A illustrates one exemplary embodiment of the disclosed systems and methods which may be implemented with the system architecture of FIG. 4A to use main system memory 215 as a shared interface between integrated management controller 298 and network controller 260 of information handling system 400 in order to achieve a relatively high speed data path for incoming data packets from network 290 to management controller 298. As shown in the exemplary embodiment of FIG. 5A, in STEP 1 incoming network packets are received across network interface 292 by network controller 260, filtered by network controller 260 based on the MAC address of management controller 298, and then packets 502 destined for management controller 298 are transferred via direct memory access (DMA) from the PCIe device across DDR 250 to a receive buffer allocated for management controller 298 in main memory 215 (e.g., such as in an Advanced Configuration and Power Interface "ACPI" theft area or other suitable area). Such a receive buffer area may be allocated by system BIOS executing on host processing device 207 in an area of main memory 215 that is in the memory map of host processing device 207 and that is accessible to BIOS in system management interrupt (SMI) and to management controller 298 using DMA, but that is not reported to an operating system/s executing on host processing device 207. Host processing device 207 may initiate the DMA transfer of received packets 502 in STEP 1.

After the filtered packets are transferred in STEP 1 of FIG. 5A to the receive buffer allocated in main memory 215 for management controller 298, network controller 260 then causes transmission of an interrupt 504 (e.g., such as Message Signaled Interrupt "MSI-X") via PCI-e to host processing device 207 in STEP 2, which in turn then initiates a DMA transfer of received packets 506 from management controller receive buffer of main memory 215 to MC memory 275 in STEP 3 (e.g., DMA transfer through DMA controller 575 by a path from system memory 215 via DDR 250 to DMA controller 575 and then via DDR 270 to MC memory 275, or alternatively via digital IO communication path 227). In the embodiment of FIG. 5A, host processing device 207 is aware of the completion of received packet DMA transfer of STEP 3. Accordingly, when host processing device 207 becomes aware of such completion of STEP 3, the host processing device 207 may in STEP 4 notify management controller 298 via an interrupt request 507 across digital IO signal interface 227 that the incoming received packets are now available to be read by MC 298 in its memory 275. This is followed by STEP 5 where management controller 298 retrieves the received packets 510 from MC memory 275 across DDR channel 270 as shown. In such an embodiment, transfer of received network packets from network controller 260 across PCIe bus 252 and DDR 250 and DDR 270 to management controller 298 may be accomplished at much greater speed than across a conventional RMII-based NC-SI interface.

Figure 5B:
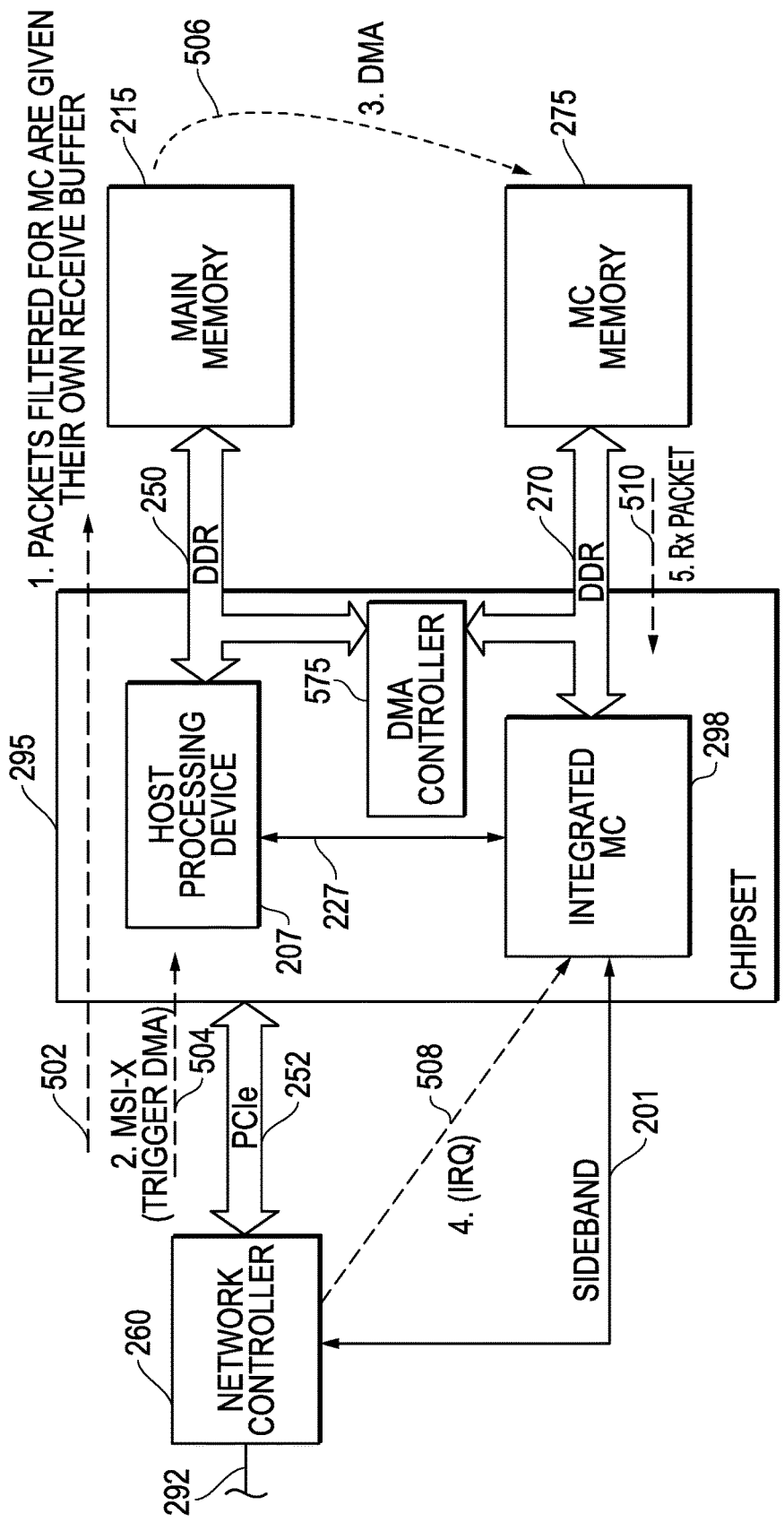
FIG. 5B illustrates methodology for communication of incoming network traffic according one exemplary embodiment of the disclosed systems and methods.

FIG. 5B illustrates an alternative embodiment that may be employed using optional sideband interface 201 of FIG. 4A when it is present to signal start and stop of packet transfers, such as during ACPI S0 "on" power state for system 400. In this case, packets may only be transferred across sideband connection 201, during S5 "off" state of system 400 or one of system sleep states S2-S4. In the embodiment of FIG. 5B, sideband interface 201 may be a one-wire or two-wire I²C interface or any other suitable sideband interface such as 12-wire high speed sideband interface, RBT, SMBus using NC-SI protocol or any other suitable protocol. In this embodiment, STEPS 1, 2, 3 and 5 may be performed as previously described according to the embodiment of FIG. 5A. However, when host processing device 207 becomes aware of completion of DMA transfer STEP 3 described in relation to FIG. 5A, it may set a write complete (packet "valid") flag in the memory 275 rather than asserting interrupt request 507 as in the embodiment of FIG. 5A. When network controller 260 becomes aware of the presence of a packet, it may then asynchronously send an interrupt request 508 (e.g., either by direct digital pin or by a command over sideband interface connection 201) in STEP 4 that triggers MC 298 to poll for the "valid" flag in the packet memory space 275. Presence of the packet "valid" flag indicates to MC 298 that the packet may be read, after which the packet is read by MC 298 in STEP 5. The interrupt request 508 of FIG. 5B may be implemented instead of a direct interrupt 507 of FIG. 5A from host processing device 207 to MC 298, and may be used when path of direct interrupt 507 is not available or for any other reason.

In FIG. 5B, the packet-available notification interrupt request 508 across sideband 201 may be made on a packet-by-packet basis. However, in an alternative embodiment, multiple incoming packets may be signaled by a command over sideband interface 201. In this alternate embodiment, network controller 260 may identify the presence of multiple consecutive incoming network packets when a second packet starts arriving within a short time of the time after a previous first packet's operation has completed, and network controller may identify when receipt of these multiple consecutive packets have terminated based on lack of activity in network controller 260. Hence network controller 260 may send commands across sideband interface 201 to MC 298 to signal start and stop of multiple consecutive incoming packet activity, in which case the 'stop' command may be used to trigger MC 298 to poll for the completion flag. As indicated above, in one embodiment a 'stop' may be determined by a lack of activity in the network controller 260. As an example, an interrupt request 508 may be sent by network controller 260 as a "start-of-activity" notification to management controller 298 that signifies multiple back-to-back incoming packets are to be available in shared MC memory 275. During this signaled "active" incoming packet period, management controller 298 may repeatedly or periodically poll shared memory 275 to retrieve incoming packets 370. In this alternate embodiment, a "stop" of incoming packet transfer activity may be signaled to management controller 298 by timeout due to lack of notification interrupt request 508 transmitted from network controller 260. In any case, STEP 4 may be followed by previously-described STEP 5 where management controller 298 retrieves the received packets 510 from MC memory 275 across DDR channel 270 as shown. Once again, transfer of received network packets from network controller 260 across PCIe bus 252 and DDR 250 and DDR 270 to management controller 298 may be accomplished at much greater speed than across a RMII-based NC-SI interface.

Figure 5C:
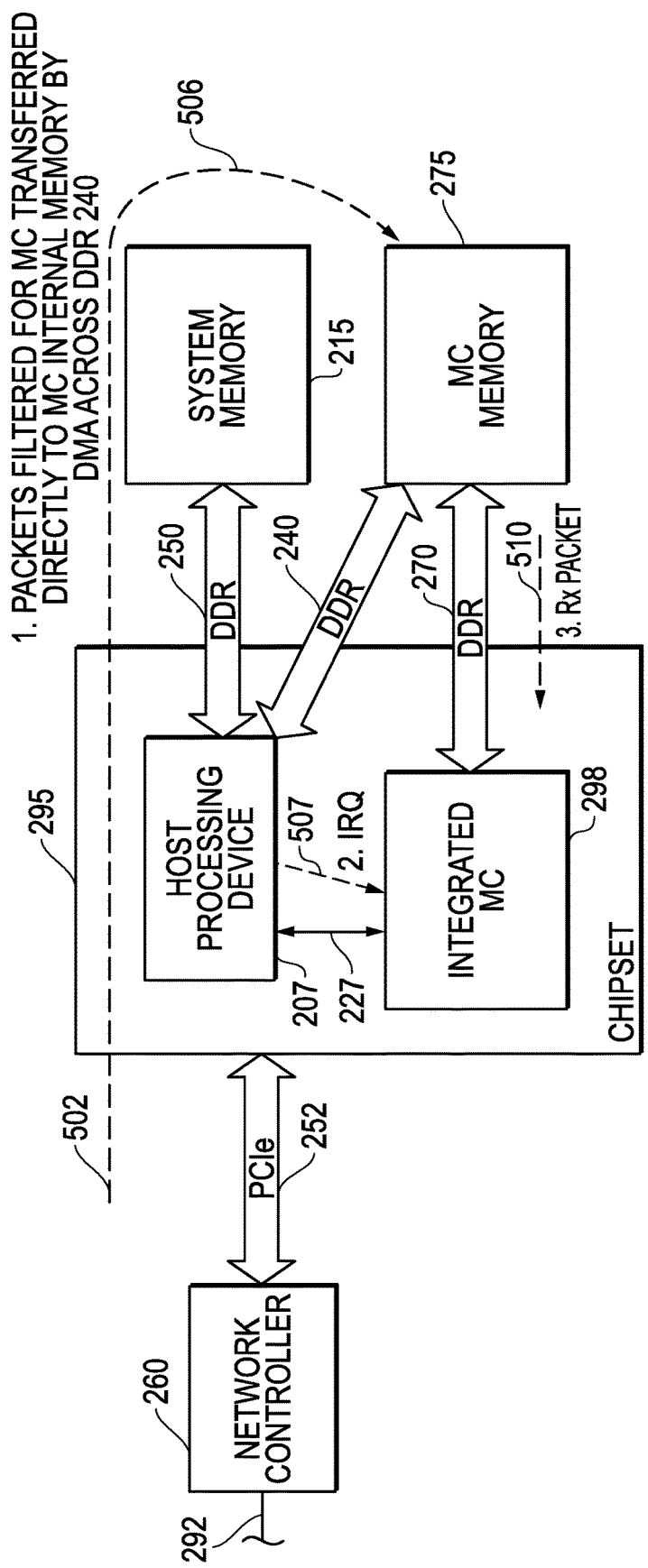
FIG. 5C illustrates methodology for communication of incoming network traffic according one exemplary embodiment of the disclosed systems and methods.

It will be understood that the embodiment of FIGS. 5A and 5B are exemplary only and that other alternatives are possible. For example, in an alternate embodiment illustrated in FIG. 5C, received incoming network packets destined for MC 298 may be transferred directly by DMA across a direct DDR channel path 240 from host processing device 207 to MC memory 275 in a single STEP 1 that replaces STEPS 1-3 of FIG. 5A, e.g., in which case STEPs 2 and 3 of FIG. 5C correspond to STEPs 4 and 5 of FIG. 5A, respectively. In another example illustrated in FIG. 5D, the disclosed systems and methods may be implemented with an alternate system architecture having a non-integrated external management controller 280 such as illustrated in FIG. 4B. In such an alternate embodiment, STEPS 1-2 and STEPS 4-5 may be implemented in similar manner as described in relation to FIG. 5A, except interrupt request 511 is transferred from processing device 209 to external MC 280 across digital IO communication path 220 for the same reason, but instead of, interrupt request 507 of FIG. 5A.

Figure 5D:
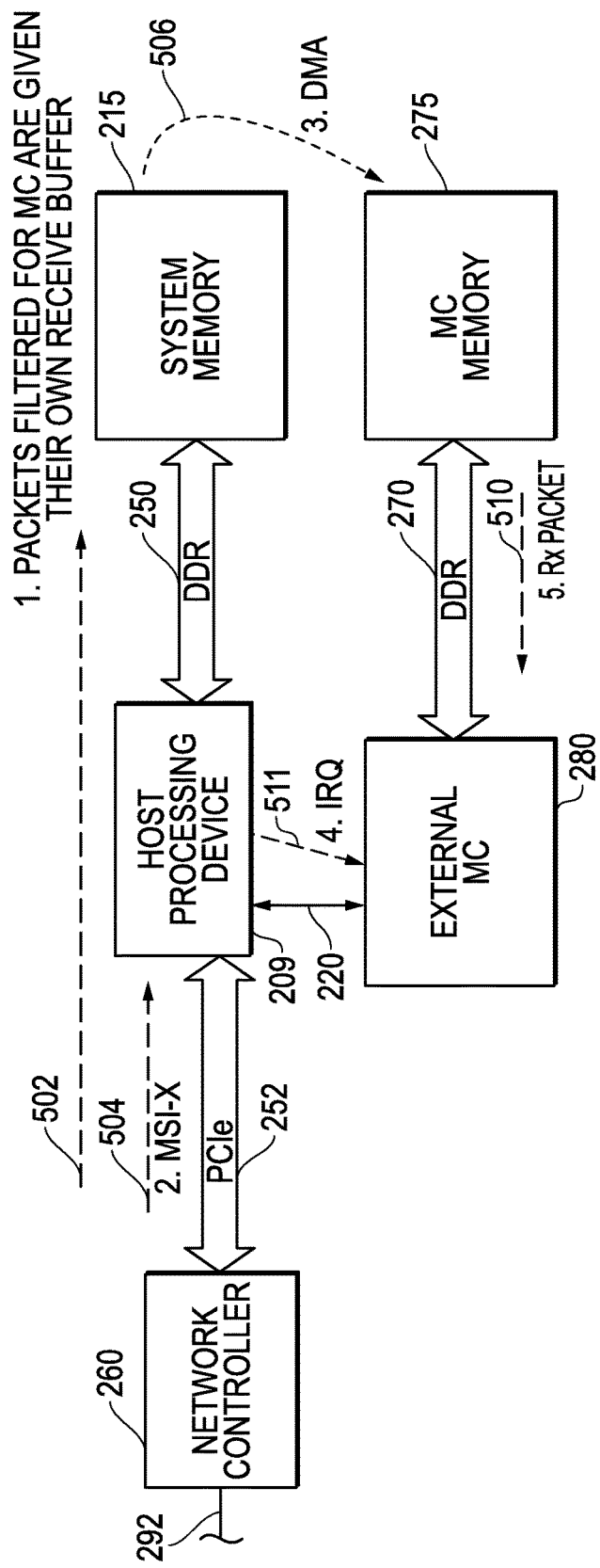
FIG. 5D illustrates methodology for communication of incoming network traffic according one exemplary embodiment of the disclosed systems and methods.

However, STEP 3 may be performed in this alternate case of FIG. 5D by host processing device 209 signaling a DMA transfer of received packets from the allocated management controller receive buffer area of main memory 215 to MC memory 275 via digital IO communication path 220 or other suitable data path connection. Similar to the packet receipt embodiment of FIG. 5A, transfer of incoming packets from network controller 260 to external management controller 280 across PCIe bus 252, DDR 250 and DDR 270 to external management controller 280 may be accomplished at much greater speed than across a RMII-based NC-SI interface.

Figure 6A:
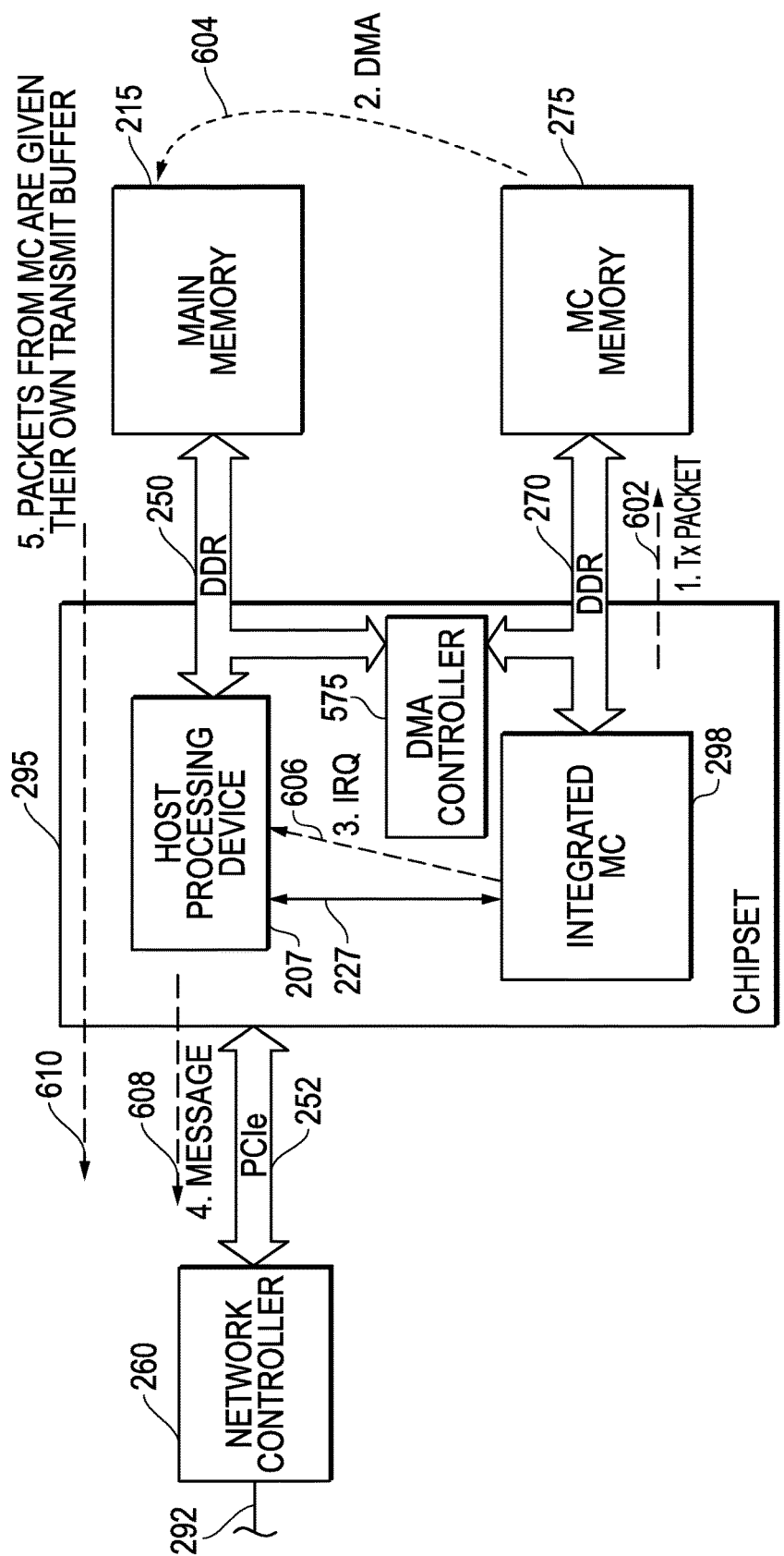
FIG. 6A illustrates methodology for communication of outgoing network traffic according one exemplary embodiment of the disclosed systems and methods.

FIG. 6A illustrates one exemplary embodiment of the disclosed systems and methods which may be implemented with the system architecture of FIG. 4A to use main system memory 215 as a shared interface between integrated management controller 298 and network controller 260 of information handling system 400 in order to achieve a relatively high speed data path for outgoing network data packets from management controller 298 to network 290. As shown in the exemplary embodiment of FIG. 6A, in STEP 1 outgoing packets 602 destined for network 290 are transmitted from integrated MC 298 across DDR channel 270 to MC memory 275. In STEP 2, integrated MC 298 then may initiate a DMA transfer of transmitted packets 604 from MC memory 275 to management controller transmit buffer of main memory 215 that is allocated by a host memory controller for an area where the MC 298 is allowed to DMA (e.g., such as in an ACPI theft area or other suitable area). In one embodiment, such a transmit buffer area may be allocated by system BIOS executing on host processing device 207 in an area of main memory 215 that is in the memory map of host processing device 207 and that is accessible to BIOS in system management interrupt (SMI) and to management controller 298 using DMA, but that is not reported to an operating system/s executing on host processing device 207. In one embodiment, STEP 2 packet transfer may be a DMA transfer through DMA controller 575 by a path from MC memory 275 via DDR 270 to DMA controller 575 and then via DDR 250 to system memory 215, or alternatively may be via digital IO communication path 227

Still referring to the embodiment of FIG. 6A, integral MC 298 is aware of the completion of received packet DMA transfer of STEP 2. Accordingly, when MC 298 becomes aware of such completion of STEP 2, the MC 298 may in STEP 3 notify host processing device 207 via an interrupt request 606 across digital IO communication path 227 that the outgoing packets are now available to be read and retrieved from the transmit buffer allocated in main memory 215. This is followed by STEP 4 where host processing device 207 forwards a message 608 across PCIe bus 252 to network controller 260 which indicates that outgoing packets are ready to be pulled from the transmit buffer, and STEP 5 where the outgoing packets 610 are pulled from transmit buffer of main memory 215 across DDR channel 250 and PCIe bus 252 by network controller 260 for transmission across network data link interface 292 to network 290. Network controller 260 continues pulling and transmitting outgoing packets 610 until end-of-packet (EOP) is detected by network controller 260.

Figure 6B:
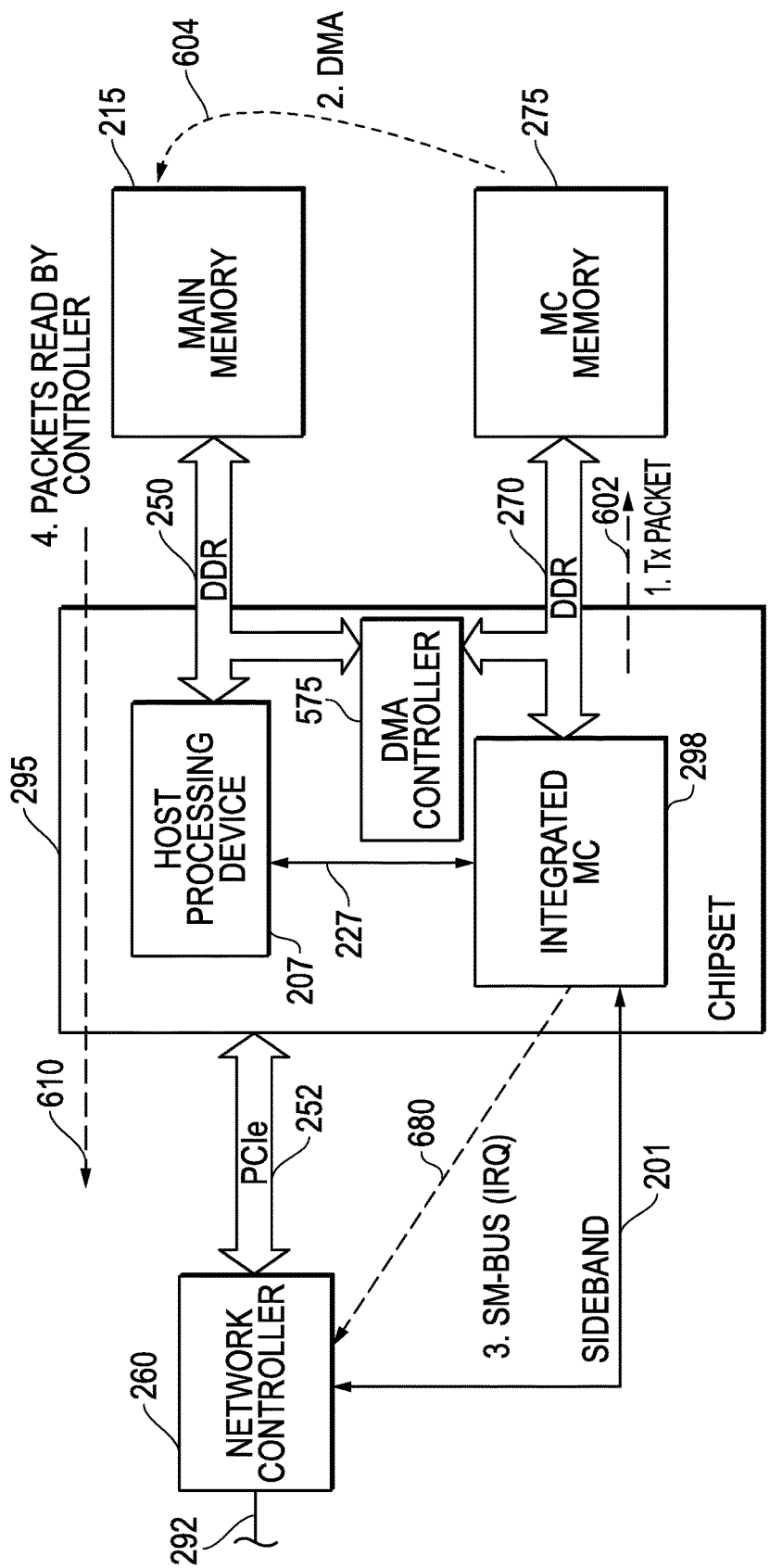
FIG. 6B illustrates methodology for communication of outgoing network traffic according one exemplary embodiment of the disclosed systems and methods.

FIG. 6B illustrates an alternative embodiment that may be employed using optional sideband interface 201 of FIG. 4A when it is present to signal start and stop of packet transfers, such as during S0 "on" power state for system 400. In one embodiment, packets may only be transferred across sideband connection 201, during S5 "off" state of system 400 or one of system sleep states S2-S4. In the embodiment of FIG. 6B, sideband interface 201 may be a one-wire or two-wire I²C interface or any other suitable sideband interface such as 12-wire high speed sideband interface, RBT, SMBus using NC-SI protocol or any other suitable protocol. In this embodiment, STEPS 1 and 2 may be performed as previously described according to the embodiment of FIG. 6A. However, STEP 3 of FIG. 6A may be replaced in FIG. 6B by using integrated MC 298 to forward an interrupt request 680 (e.g., single wire IRQ or other suitable interrupt) across sideband interface connection 201 to network controller 260 to indicate outgoing packets are ready to be pulled from the transmit buffer of main memory 215, e.g., such as during early system boot state or when a system user has disabled network controller 260 from being seen by host processing device 207. This is followed by STEP 4 (which is similar to STEP 5 of FIG. 5A) where the outgoing packets 610 are pulled from transmit buffer of main memory 215 across DDR channel 250 and PCIe bus 252 by network controller 260 for transmission across network data link interface 292 to network 290.

In FIG. 6B, the packet-available notification interrupt request 680 across sideband 201 may be made in STEP 3 on a packet-by-packet basis. However, in an alternative embodiment, an interrupt request 680 may be sent by integrated MC 298 as a "start-of-activity" notification to network controller 260 that signifies multiple back-to-back incoming packets are to be available in main memory 215. During this signaled "active" incoming packet period, network controller 260 may repeatedly or periodically poll main memory 215 to retrieve outgoing packets 610. In this alternate embodiment, a "stop" of incoming packet transfer activity may be signaled to network controller 260 by timeout due to lack of notification interrupt request 680 transmitted from integrated MC 298. In any case, STEP 3 may be followed by STEP 4 (similar to previously-described STEP 5 of FIG. 6A) where network controller 260 retrieves the outgoing packets 610 from main memory 215 across DDR channel 250 as shown. Once again, transfer of outgoing network packets from integrated MC 298 across DDR 270, DDR 250 and PCIe bus 252 to network controller 260 may be accomplished at much greater speed than across a RMII-based NC-SI interface. Synchronization between STEPS 2 and 3 of FIG. 6B may be achieved in one embodiment with write complete (packet valid) flag set in main memory 215 that indicates that the packet is ready to be read. MC 298 may send an interrupt request 680 to network controller 260 asynchronously before the transfer is complete, which in turn causes network controller 260 to poll for the presence of the packet valid flag in main memory 215. MC 298 in this case is the sender of the packet and may be the 'setter' of that packet valid flag. Thus, in one embodiment, the sequence may be as follows: MC 298 writes the packet, DMA starts, MC 298 interrupts network controller 260, DMA finishes, e.g., MC 298 may set the flag explicitly, or it may be set with the final byte of the transfer, and then network controller 260 reads the packet.

Figure 6C:
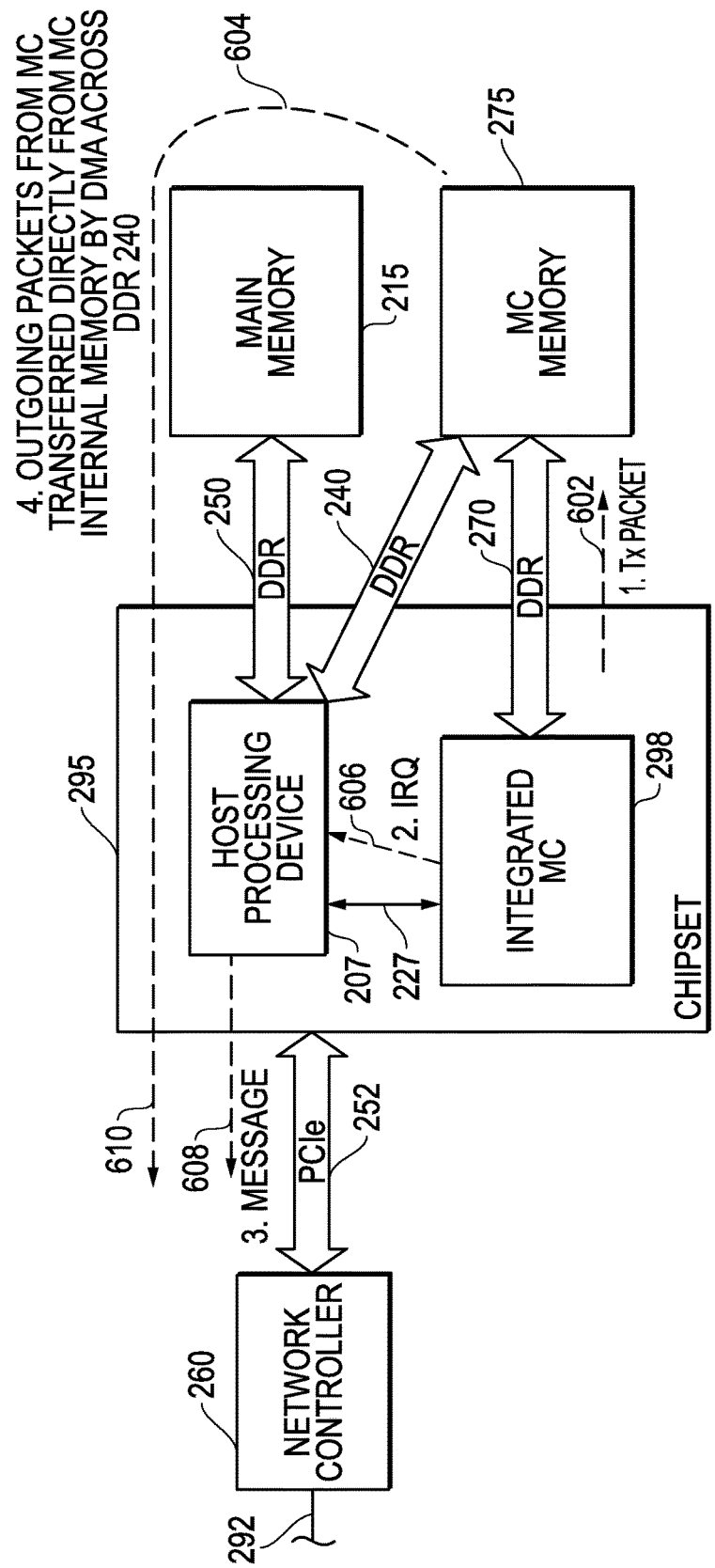
FIG. 6C illustrates methodology for communication of outgoing network traffic according one exemplary embodiment of the disclosed systems and methods.
Figure 6D:
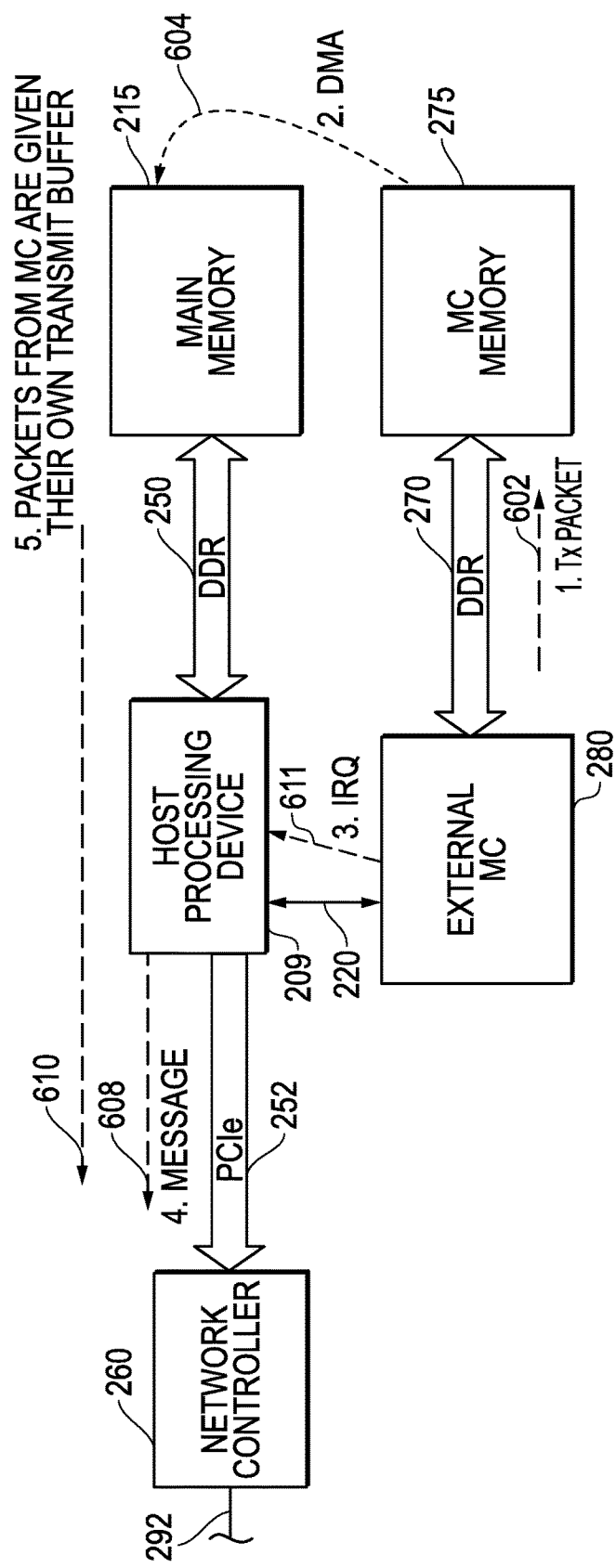
FIG. 6D illustrates methodology for communication of outgoing network traffic according one exemplary embodiment of the disclosed systems and methods.

It will be understood that the embodiment of FIGS. 6A and 6B are exemplary only and that other alternatives are possible. For example, in an alternate embodiment illustrated in FIG. 6C, transmitted outgoing network packets destined for network controller 260 may be transferred directly by DMA across a direct DDR channel path 240 from MC memory 275 to host processing device 207 in a single STEP 4 that replaces STEPS 2 and 5 of FIG. 6A, e.g., in which case STEPs 1, 2 and 3 of FIG. 6C correspond to STEPs 1, 3 and 4 of FIG. 6A, respectively. In another example, the disclosed systems and methods may be implemented with an alternate system architecture having a non-integrated external memory controller 280 such as illustrated in the exemplary embodiment of FIG. 6D. In such an alternate embodiment of FIG. 6D, STEP 1 and STEPS 3-5 may be implemented in the same manner as described in relation to FIG. 6A. In such an alternate embodiment, STEPS 1-2 and STEPS 4-5 may be implemented in similar manner as described in relation to FIG. 6A, except interrupt request 611 is transferred from non-integrated external MC 280 to host processing device 209 across digital IO communication path 220 for the same reason, but instead of, interrupt request 606 of FIG. 6A. However, STEP 2 may be performed in this alternate case by external management controller 280 initiating a DMA transfer of transmitted packets from MC memory 275 to the allocated management controller transmit buffer area of main memory 215 via digital 10 communication path 220 or other suitable data path connection. Similar to the packet transmit embodiment of FIG. 6A, transfer of outgoing packets from external management controller 280 to network controller 260 across DDR 270, DDR 250 and PCIe 252 to network controller 260 may be accomplished at much greater speed than across a RMII-based NC-SI interface.

It will be understood that the architecture of FIGS. 5B and 6B may be implemented in one embodiment to make use of a SMBus within the standard PCIe pin-outs or other type of suitable sideband interface for two purposes: 1) an interrupt mechanism to and from the embedded controller; and 2) a packet-carrying interface while the PCIe interface is powered down (e.g., S5 power state). Note that for purpose no. 2 above, this may only be possible on a card powered with auxiliary power such as currently available network daughter cards. However, it will be further understood that the use of shared system memory and/or sideband interrupt signaling while the server is "ON" in the S0 power state (i.e., the power state that requires the highest bandwidth for applications such as out of band remote desktop) is not limited to LOMs, network daughter cards (NDCs), etc.

Figure 7:
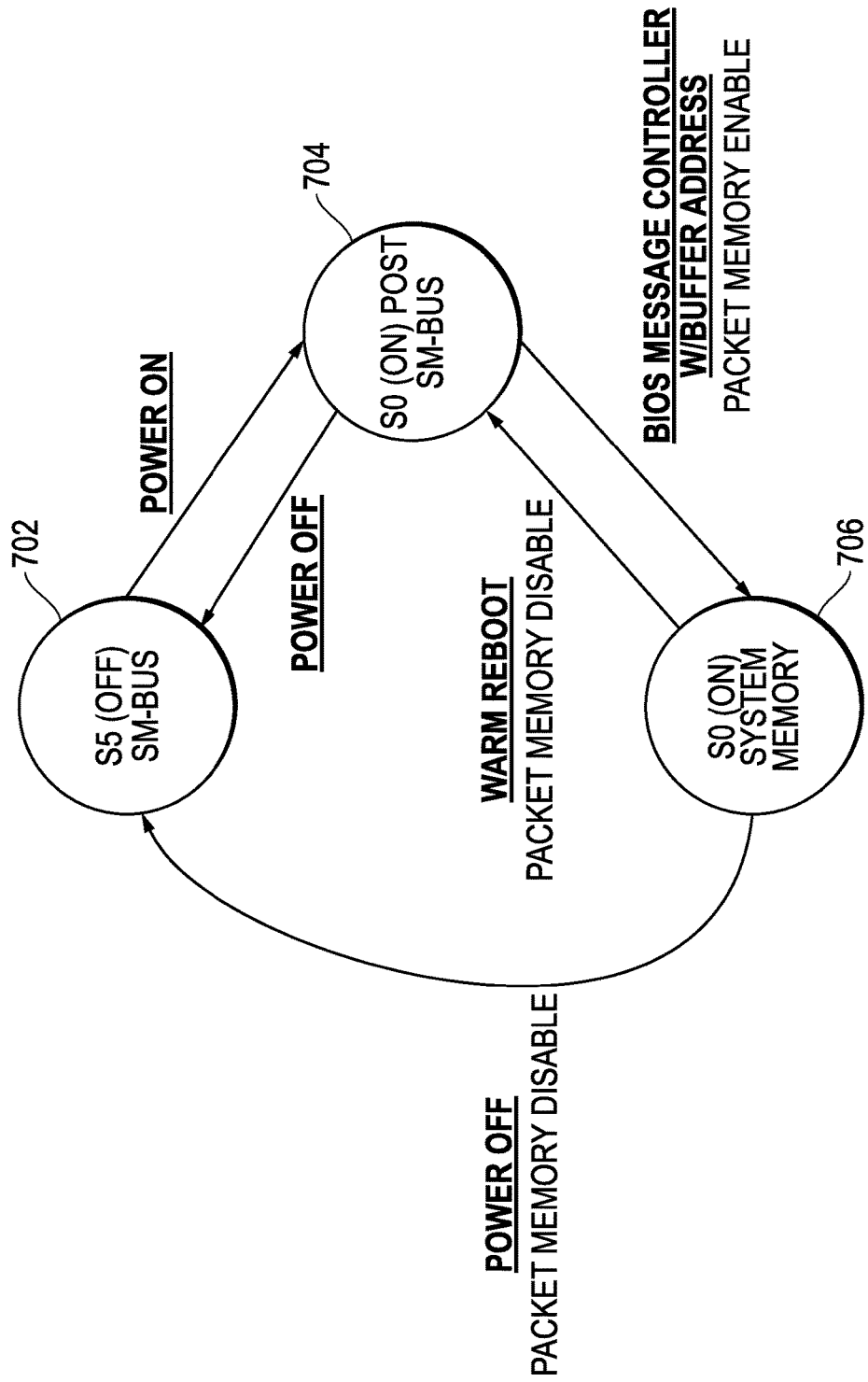
FIG. 7 illustrates power state transitions according one exemplary embodiment of the disclosed systems and methods.

FIG. 7 illustrates one exemplary embodiment of how power state transitions may be handled for transferring control back and forth between the SMBus sideband and system memory interfaces depending on system power state, e.g., such as for the example architecture and methodologies of FIGS. 5B and 6B. It will be understood that the embodiment of FIG. 7 is exemplary only, and that any other suitable power state transition methodology may be employed. In the embodiment of FIG. 7, a message from the embedded controller 298 may be sent to the network controller 260 to direct the network controller 260 which packet communication interface to use. In such an embodiment, the embedded controller 298 is cognizant of the server state transitions, and system BIOS may make the embedded controller 298 aware of when main system memory 215 has been allocated with receive and transmit buffer area/s for purposes of communicating network packets using the shared memory high speed interface. It is further noted that the disclosed systems and methods may be implemented for other architectures, i.e., an embedded LOM deployed in the chipset and an external management controller (e.g., such as optional chipset embodiment of FIG. 4B), with any two devices that support DMA, etc.

In particular, FIG. 7 illustrates how enablement and disablement of the system memory interface 250 may be handled during power state transitions. In the embodiment of FIG. 7, during power on operations, the system power state transitions from S5 "OFF" power state 702 through S0 power on self-test (POST) power state 704 to S0 "ON" power state 706 as shown. As further shown, between power states 704 and 706 system BIOS may allocate receive and transmit buffer memory address/es for management controller 298 in main memory 215 (e.g., such as in an Advanced Configuration and Power Interface "ACPI" theft area or other suitable area) and provide a packet memory enable message containing the receive and transmit buffer address/es to network controller 260 that directs network controller 260 to begin using the main system memory interface 250 and the specified receive and transmit buffer address/es in main memory 215 for network packet communications with management controller 298 during the S0 "ON" system power state.

Still referring to FIG. 7, upon orderly system power down (e.g., warm reboot) from S0 "ON" power state 706 through power state 704 to S5 "OFF" power state 702, a packet memory disable message may be provided from management controller 298 to network controller 260 during the transition between power states 706 and 704 as shown. This packet memory disable message may be, for example, a specified OEM or other type of command in the NC-SI protocol command set defined to be sent over sideband connection 201 (e.g., SMBus) from management controller 298 to network controller 260 that directs the network controller 260 to use sideband interface 201 for network communications with management controller 298 during the S5 "OFF" power state. A similar packet memory disable message may be sent from management controller 298 to network controller 260 during a disorderly shutdown (e.g., such as unexpected AC mains power disconnection) directly from S0 "ON" power state 706 to S5 "OFF" power state 702 as shown.

It will also be understood that one or more of the tasks, functions, or methodologies described herein (e.g., including those described herein for components 207, 209, 260, 280, 298, 575, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
a processing device configured as a network interface controller (NIC), the NIC being configured to be coupled to intercept and exchange all incoming and outgoing network data packets transferred between any components of the information handling system and a network that is external to the information handling system, the NIC being configured to operate at the physical layer and data link layer to perform MAC address filtering for incoming packets to the information handling system:
main system memory;
a host processing device coupled between the NIC and the main system memory with the NIC coupled between the host processing device and the external network;
an additional processing device configured as a service processor or baseboard management controller (BMC) that is a separate processing device from the host processing device and the NIC, the additional processing device being coupled to the host processing device with the host processing device being coupled between the additional processing device and the NIC; and
additional memory for the additional processing device, the additional processing device memory coupled to the additional processing device with the additional processing device being coupled between the additional memory and the host processing device, and the additional processing device memory being separate from the main system memory;
where one or more of the processing devices of the system are configured to provide incoming network data packets filtered by the NIC as destined for the MAC address of the additional processing device from the network controller to the additional processing device through the additional processing device memory; and
where one or more of the processing devices of the system are configured to provide outgoing network data packets from the additional processing device to the NIC through the additional processing device memory, where the main system memory is DRAM and the additional processing device memory is DRAM; and
where one or more of the processing devices of the system are configured to:
receive incoming network packets from the external network in the NIC;
provide the received incoming network data packets filtered by the NIC for the additional processing device from the NIC to a receive buffer allocated for these filtered incoming network data packets in an area of the main system memory that is in a memory map of the host processing device by system BIOS executing on the host processing device, then transfer the incoming network data packets from the receive buffer of the main system memory to the additional processing device memory, and then transfer the incoming network data packets from the additional processing device memory to the additional processing device; and
provide outgoing network data packets from the additional processing device to the additional processing device memory, then transfer the outgoing network data packets from the additional processing device memory to a transmit buffer allocated for these outgoing network data packets in an area of the main system memory for the outgoing network data packets that is in the memory map of the host processing device by system BIOS executing on the host processing device, and then transfer the outgoing network data packets from the transmit buffer of the main system memory to the NIC for transmission to the external network.

2. The information handling system of claim 1, where one or more of the processing devices of the system are configured to:
provide the incoming network data packets from the NIC to the host processing device, then transfer the incoming network data packets directly from the host processing device to the additional processing device memory, and then transfer the incoming network data packets from the additional processing device memory to the additional processing device; and
provide outgoing network data packets from the additional processing device to the memory controller memory, then transfer the outgoing network data packets directly from the memory controller memory to the host processing device, and then transfer the outgoing network data packets from the host processing device to the NIC for transmission to the external network.

3. The information handling system of claim 1, where one or more of the processing devices of the system are configured to use direct memory access (DMA) to:
provide the incoming network data packets from the NIC to the receive buffer of the main system memory, transfer the incoming network data packets from the receive buffer of the main system memory to the additional processing device memory by direct memory access, and then transfer the incoming network data packets from the additional processing device memory to the additional processing device; and
provide the outgoing network data packets from the additional processing device to the memory controller memory, then transfer the outgoing network data packets from the memory controller memory to the transmit buffer of the main system memory, and then transfer the outgoing network data packets from the transmit buffer of the main system memory to the NIC for transmission to the external network.

4. The information handling system of claim 3, further comprising a DMA controller that is part of a DMA channel that is coupled between the main system memory and the additional processing device memory, the DMA channel and its DMA controller being located completely outside the host processing device and completely outside the additional processing device; and where the one or more processing devices are configured to:
transfer the incoming network data packets from the receive buffer of the main system memory through the DMA channel and its DMA controller to the additional processing device memory by direct memory access before transferring the incoming network data packets from the additional processing device memory to the additional processing device memory; and
provide the outgoing network data packets from the additional processing device memory through the DMA channel and its DMA controller to the transmit buffer of the main system memory before transferring the outgoing network data packets from the transmit buffer of the main system memory to the NIC for transmission to the external network.

5. The information handling system of claim 1, where the host processing device and the additional processing device are coupled together by a digital IO communication path; and where the host processing device is configured to send an interrupt request across the digital IO signal interface to notify the additional processing device when one or more of the received incoming packets are available to be read by the additional processing device from the additional processing device memory; and where the additional processing device is configured to send an interrupt request across the digital IO signal interface to notify the host processing device when one or more of the outgoing packets are available to be read and retrieved from the transmit buffer allocated in the system main memory.

6. The information handling system of claim 5, further comprising a chipset, the host processing device and the additional processing device being integrated components of the chipset; where the additional processing device memory is on-chip internal memory of the additional processing device; and where the host processing device and the additional processing device are coupled together on the chipset by the digital IO communication path.

7. The information handling system of claim 1, where the NIC is coupled to the additional processing device by a sideband interface connection; and
where the host processing device is configured to set a packet valid flag in the memory controller memory when one or more of the incoming packets have been transferred from the receive buffer of the main system memory to the memory controller memory, where the NIC is configured to send an interrupt request across the sideband interface to the additional processing device when it becomes aware of receipt of the one or more incoming network packets from the external network, where the memory controller is configured to respond to the interrupt request from the NIC by polling the memory controller memory to detect the presence of the packet valid packet flag, and where the memory controller is configured to respond to the detection of the packet valid flag by reading the one or more incoming network packets from the memory controller memory; and where the additional processing device is configured to send an interrupt request across the sideband interface to the NIC when the outgoing network packets are present in the transmit buffer of the main system memory, and where the NIC is configured to respond to the interrupt request received from the additional processing device by pulling the outgoing network packets from the transmit buffer of the main memory for transmission to the external network.

8. The information handling system of claim 7, further comprising a chipset, the host processing device and the additional processing device being integrated components of the chipset; where the additional processing device memory is on-chip internal memory of the additional processing device; and where the NIC is coupled to the integrated additional processing device by the sideband interface connection.

9. The information handling system of claim 1, where the additional processing device is external and non-integrated with the host processing device; where the host processing device is coupled to the additional processing device by a digital IO communication path; and
where the host processing device is configured to initiate transfer of the received incoming network packets from the receive buffer area of the main system memory to the memory controller memory across the digital IO communication path; and
where the external additional processing device is configured to initiate transfer of the outgoing network packets from the memory controller memory to the transmit buffer area of the main system memory across the digital IO communication path.

10. An information handling system, comprising:
a processing device configured as a network controller, the network controller being configured to be coupled to exchange incoming and outgoing network data packets with an external network;
main system memory;
a host processing device coupled to the network controller and coupled to the main system memory;
a processing device configured as a management controller, the management controller being coupled to the host processing device; and
management controller memory coupled to the management controller;
where one or more of the processing devices of the system are configured to provide incoming network data packets from the network controller to the management controller through the management controller memory;
where one or more of the processing devices of the system are configured to provide outgoing network data packets from the management controller to the network controller through the management controller memory; and
where the network controller is coupled to the management controller by a sideband interface connection; and
where one or more of the processing devices are configured to detect whether the system is in an advanced configuration and power interface (ACPI) S0 (ON) power state or is in an ACPI S5 (OFF) power state, and then:
provide incoming network data packets from the network controller to the management controller through the management controller memory, and provide outgoing network data packets from the management controller to the network controller through the management controller memory when the system is detected to be in an ACPI S0 (ON) power state, and provide incoming network data packets from the network controller to the management controller across the sideband interface connection, and provide outgoing network data packets from the management controller to the network controller across the sideband interface connection when the system is detected to be in an ACPI S5 (OFF) power state.

11. A method of handling network packets in an information handling system, comprising:

using a processing device configured as a network controller of the information handling system to exchange incoming and outgoing network data packets with an external network;

providing incoming network data packets to the information handling system from the network controller to a processing device configured as a management controller of the information handling system through management controller memory of the information handling system that is coupled to the management controller; and providing outgoing network data packets from the management controller to the network controller through the management controller memory;

where the network controller is coupled to the management controller by a sideband interface connection; and where the method further comprises using one or more of the processing devices to detect whether the system is in an advanced configuration and power interface (ACPI) S0 (ON) power state or is in an ACPI S5 (OFF) power state, and then:

provide incoming network data packets from the network controller to the management controller through the management controller memory, and provide outgoing network data packets from the management controller to the network controller through the management controller memory when the system is detected to be in an ACPI S0 (ON) power state, and provide incoming network data packets from the network controller to the management controller across the sideband interface connection, and provide outgoing network data packets from the management controller to the network controller across the sideband interface connection when the system is detected to be in an ACPI S5 (OFF) power state.

12. A method of handling network packets in an information handling system having a host processing device, comprising:

using a processing device configured as a network interface controller (NIC) of the information handling system to intercept and exchange all incoming and outgoing network data packets transferred between any components of the information handling system and a network that is external to the information handling system, the NIC coupled between the host processing device and the external network;

operating the NIC at the physical layer and data link layer to perform MAC address filtering for incoming packets to the information handling system;

providing incoming network data packets to the information handling system and filtered by the NIC as destined for the MAC address of an additional processing device of the information handling system from the NIC to an additional processing device configured as a service processor or baseboard management controller (BMC) that is a separate processing device from the host processing device and the NIC of the information handling system through additional memory of the information handling system that is coupled to the additional processing device, the additional processing memory being for the additional processing device and being separate from the main system memory, and the host processing device being coupled between the additional processing device and the NIC with the additional processing device being coupled between the additional memory and the host processing device; and providing outgoing network data packets from the additional processing device to the NIC through the additional processing device memory, where the main system memory is DRAM and the additional processing device memory is DRAM; and where the method further comprises:

using the NIC to receive incoming network packets from the external network in the NIC;

providing the received incoming network data packets filtered by the NIC for the additional processing device from the NIC to a receive buffer allocated for these filtered incoming network data packets in an area of the main system memory that is in a memory map of the host processing device by system BIOS executing on the host processing device, then transferring the incoming network data packets from the receive buffer of the main system memory to the additional processing device memory, and then transferring the incoming network data packets from the additional processing device memory to the additional processing device; and providing outgoing network data packets from the additional processing device to the memory controller memory, then transferring the outgoing network data packets from the memory controller memory to a transmit buffer allocated for these outgoing network data packets in an area of the main system memory for the outgoing network data packets that is in the memory map of the host processing device by system BIOS executing on the host processing device, and then transferring the outgoing network data packets from the transmit buffer of the main system memory to the NIC for transmission to the external network.

13. The method of claim 12, further comprising using one or more of the processing devices of the information handling system to:

provide the incoming network data packets from the NIC to the host processing device, then transfer the incoming network data packets directly from the host processing device to the additional processing device memory, and then transfer the incoming network data packets from the additional processing device memory to the additional processing device; and provide outgoing network data packets from the additional processing device to the memory controller memory, then transfer the outgoing network data packets directly from the memory controller memory to the host processing device, and then transfer the outgoing network data packets from the host processing device to the NIC for transmission to the external network.

14. The method of claim 12, further comprising using one or more of the processing devices of the system to use direct memory access (DMA) to:

provide the incoming network data packets from the NIC to the receive buffer of the main system memory, transfer the incoming network data packets from the receive buffer of the main system memory to the additional processing device memory by direct memory access, and then transfer the incoming network data packets from the additional processing device memory to the additional processing device; and provide the outgoing network data packets from the additional processing device to the memory controller memory, then transfer the outgoing network data packets from the memory controller memory to the transmit buffer of the main system memory, and then transfer the outgoing network data packets from the transmit buffer of the main system memory to the NIC for transmission to the external network.

15. The method of claim 14, where the information handling system further comprises a DMA controller that is part of a DMA channel that is coupled between the main system memory and the additional processing device memory, the DMA channel and its DMA controller being located completely outside the host processing device and completely outside the additional processing device; and where the method further comprises using one or more processing devices of the information handling system to:

transfer the incoming network data packets from the receive buffer of the main system memory through the DMA channel and its DMA controller to the additional processing device memory by direct memory access before transferring the incoming network data packets from the additional processing device memory to the additional processing device memory; and provide the outgoing network data packets from the memory controller memory through the DMA channel and its DMA controller to the transmit buffer of the main system memory before transferring the outgoing network data packets from the transmit buffer of the main system memory to the NIC for transmission to the external network.

16. The method of claim 12, where the host processing device and the additional processing device are coupled together by a digital IO communication path; and where the method further comprises:

using the host processing device to send an interrupt request across the digital IO signal interface to notify the additional processing device when one or more of the received incoming packets are available to be read by the additional processing device from the additional processing device memory; and using the additional processing device to send an interrupt request across the digital IO signal interface to notify the host processing device when one or more of the outgoing packets are available to be read and retrieved from the transmit buffer allocated in the system main memory.

17. The method of claim 12, where the NIC is coupled to the additional processing device by a sideband interface connection; and the method further comprises:

using the host processing device to set a packet valid flag in the memory controller memory when one or more of the incoming packets have been transferred from the receive buffer of the main system memory to the memory controller memory, using the NIC to send an interrupt request across the sideband interface to the additional processing device when it becomes aware of receipt of the one or more incoming network packets from the external network, using the memory controller to respond to the interrupt request from the NIC by polling the memory controller memory to detect the presence of the packet valid packet flag, and using the memory controller to respond to the detection of the packet valid flag by reading the one or more incoming network packets from the memory controller memory; and using the additional processing device to send an interrupt request across the sideband interface to the NIC when the outgoing network packets are present in the transmit buffer of the main system memory, and using the NIC to respond to the interrupt request received from the additional processing device by pulling the outgoing network packets from the transmit buffer of the main memory for transmission to the external network.

18. The method of claim 12, where the additional processing device is external and non-integrated with the host processing device; where the host processing device is coupled to the additional processing device by a digital IO communication path; and where the method further comprises:

using the host processing to initiate transfer of the received incoming network packets from the receive buffer area of the main system memory to the memory controller memory across the digital IO communication path; and using the external additional processing device to initiate transfer of the outgoing network packets from the memory controller memory to the transmit buffer area of the main system memory across the digital IO communication path.

\* \* \* \* \*